Patented Mar. 17, 1953

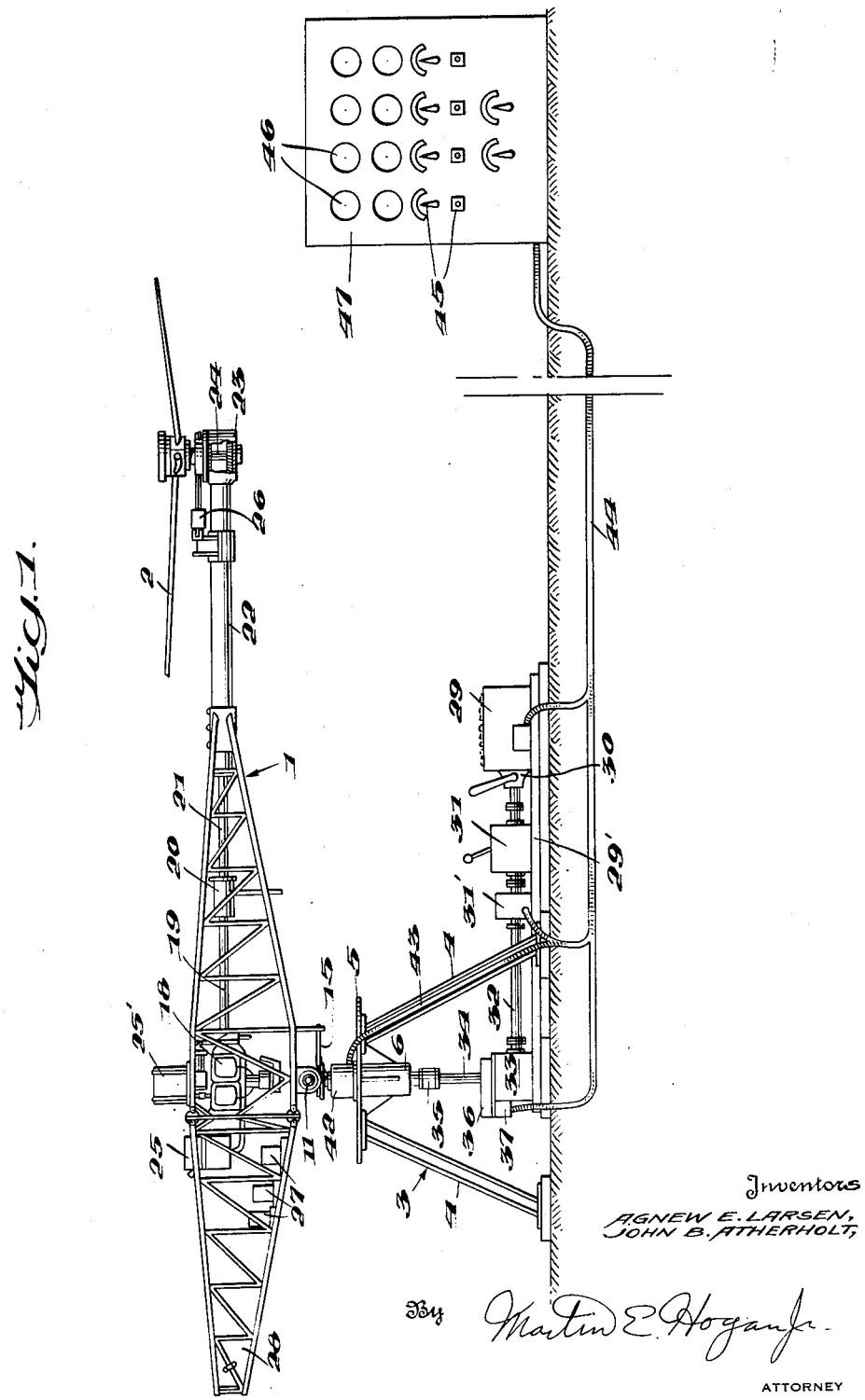

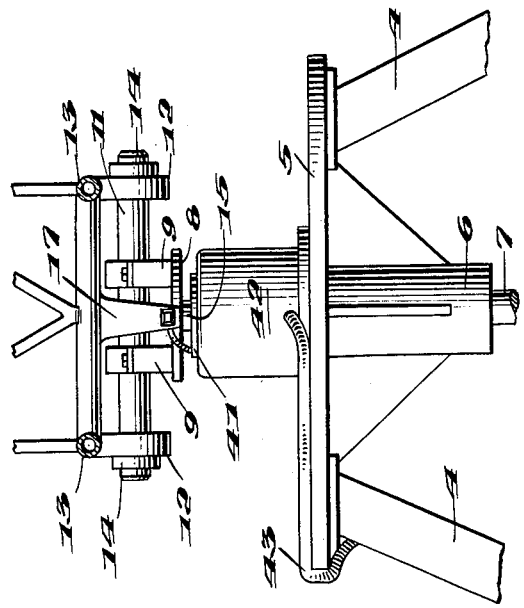
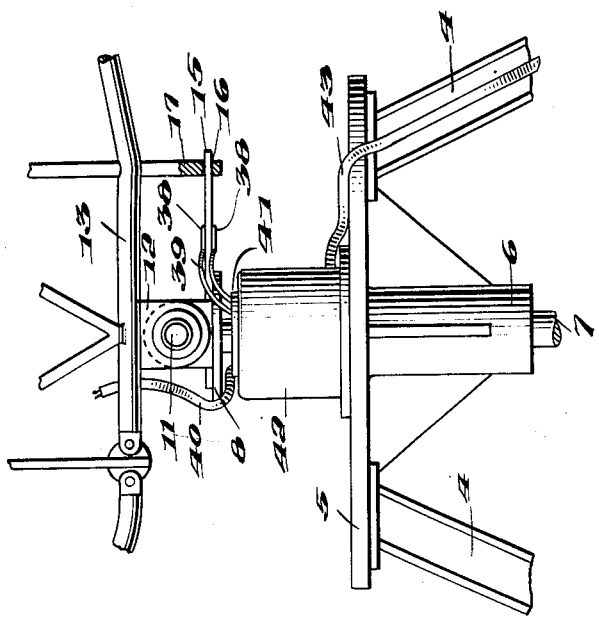

2,631,453

UNITED STATES PATENT OFFICE 2,631,453

TESTING APPARATUS FOR ROTARY WINGS

Agnew E. Larsen, New Britain, and John B. Atherholt, Glenside, Pa., assignors to The Glenn L. Martin Company, Middle River, Md., a corporation of Maryland Application May 26, 1949, Serial No. 95,544

1 Claim. (Cl. 73—147)

This invention relates to a device for testing rotors of the type used in helicopters and autogyros.

The problem of testing various designs of rotors for helicopters is quite different from that of testing the conventional wing for an airplane. Wind tunnels have been found quite adequate for the latter, since it is quite feasible to scale down the model to be tested and yet to be able to determine quite accurately how a full-size wing of the same type would perform in actual service.

In the case of helicopter rotors, however, the rotor is itself revolving and such factors as the lift, drag, etc., vary from point to point along a particular blade. The longer the blade, the greater will be the tip speed for any particular rate of rotation, and the greater will be the effects of centrifugal force and the tendency of the rotor to vibrate unduly. As a result, it is extremely difficult to predict how full-sized helicopter rotors will perform from the results of tests run in a wind tunnel with a relatively small scale model of the rotor. It is, therefore, desirable, and in fact almost essential, to use relatively large-scale rotor models for testing. This would require a wind tunnel of tremendous size and of correspondingly excessive cost in order to avoid the adverse effects which would arise due to the confining of the rotor within a restricted space, especially such effects as "ground cushion" effects due to the proximity of the rotor to the bottom of the wind tunnel. Such effects would cause the results to differ materially from those that would be obtained with the same model in free space.

It is an object of this invention to provide apparatus for testing relatively large-scale helicopter rotors, which apparatus will permit closely simulating the conditions that would be met by the rotor under actual flight conditions and yet which is relatively inexpensive to build and operate.

A further object is to provide such testing apparatus wherein the rotor to be tested is carried at the outer end of a relatively long, whirling arm and wherein the rotor is at all times spaced well above the ground.

It is a further object to provide means for readily and accurately measuring the lift developed by the rotor being tested, as well as to provide a device readily adaptable for measuring such factors as the horizontal thrust produced by the rotor and any vibratory forces set up thereby.

A still further object is to provide testing apparatus of the above type wherein the test results can be readily and continuously observed and wherein the operation of the testing apparatus itself as well as of the rotor being tested can be controlled from a suitable vantage point located at a safe distance from the apparatus.

Further objects and advantages will become apparent from the study of the following description and claim when considered in view of the accompanying drawings.

In the drawings:

Figure 1 is a somewhat diagrammatic side view of the complete testing apparatus.

Figure 2 is an enlarged fragmentary side view showing the manner in which the whirling arm is supported.

Figure 3 is a fragmentary end view of the corresponding portion of the apparatus.

The testing apparatus of this invention comprises an arm 1 formed of suitable structural members welded together as clearly shown and supported for rotation about a vertical axis. This arm is adapted to carry at its free, outer end the helicopter rotor 2 to be tested. Arm 1 is rotatably carried from a stationary support 3 formed of a plurality of legs 4 firmly anchored in the ground and carrying at their upper ends supporting plate 5. Rigid with the plate 5 and depending therefrom is a bearing housing 6 in which a vertical axle 7 is supported for rotation about its axis. Rigid with the upper end of the axle 7 is a rotatable support comprising a plate 8 having spaced, upstanding shaft supports 9, said shaft supports rigidly carrying transverse pivot shaft 11. Bearing members 12, depending from and rigid with the lower frame members 13 of the arm 1, pivotally support the arm from the pivot shaft 11. Suitable collars 14 are provided to retain the bearing members 12 on shaft 11. Rigidly carried by the plate 8 between the shaft supports 9 is a cantilever spring 15 which extends outwardly from said plate toward the outer end of the arm 1. The outer end of this spring extends through an opening 16 formed in the lower end of a depending arm 17 rigidly carried by one of the cross members of the arm 1. This spring therefore tends to resiliently hold arm 1 against rocking motion about the axis of shaft 11.

Carried by arm 1 generally above the axle 7 is a motor 18. This motor has its output shaft 19 connected to a combined clutch and free wheeling unit 20. From said unit 20 a shaft 21 extends outwardly through the outer tubular end 22 of the arm and into a gear box 23. Within the gear box, shaft 21 is connected by suitable gearing to a vertical shaft 24 to which the rotor to be tested is connected. Suitable oil and gas tanks 25, 25' are provided for the motor 18.

The usual stationary hub portion of the rotor will be suitably supported from the gear box 23. Mounted adjacent the outer end of the arm are a plurality of electrically controlled servo-units 26 which are provided for controlling the usual swash plate of the rotor being tested whereby the pitch of the rotor blades may be varied as desired. Batteries 27 are mounted on the rear portion of the arm and are provided for furnishing electrical energy to the various servo-motors etc. carried on the arm. The extreme rear end of the arm may be provided with a counterweight 28 so to cause the arm to be substantially balanced about shaft 11 with a rotor in position for testing.

To rotate the arm about the axis of axle 7 an engine 29 is provided, carried by a frame 29' anchored upon the ground, said engine including a clutch 30 and driving, through the intermediacy of a variable speed transmission 31 and an overrunning clutch or free wheeling unit 31', an output shaft 32. This shaft 32 is connected by suitable gearing within a gearing box 33 to a vertical shaft 34, the upper end of which is connected by flexible drive coupling 35 to the lower end of axle 7. A brake 36 having a suitable servo-type actuator 37 therefor is provided for controlling the rotation of the shaft 32 and therefore of the whirling arm.

For measuring the lift developed by the rotor being tested, strain gages 38 may be applied to the spring 15 as indicated in Figure 2. Leads 39 extending therefrom, as well as the electrical leads indicated generally at 40 and extending to the various servo-mechanisms and other equipment carried by the arm 1, are connected to suitable slip rings carried by the slip ring assembly 41 rigid with the axle 7. Suitable brushes, not shown, are provided for the individual slip rings of said assembly, within the housing 42 rigidly carried by the plate 6, and the wires leading therefrom are cabled together as at 43 and extend as indicated at 44 to a remotely located control and observation station where they are connected to suitable control elements 45 and indicators 46 mounted on a control panel 47. The control panel would normally be located within a suitable housing (not shown) so that in the event of failure of a rotor blade, the operator would be protected from danger.

While not specifically shown in the drawings, the motors 18 and 29 will be arranged so that they may be started and controlled from the control panel 47, conventional starters and electrical servo-mechanism being provided for this purpose. Suitable torque meters and means for measuring the rates of rotation of the whirling arm and of the rotor being tested would of course be provided, connected to certain of the indicators 46, while vibration pick-up devices would be installed at appropriate points on the arm and would likewise be connected to indicators on the panel 47. Certain of the control elements 45 will be arranged to actuate the servo-units 26 so that the pitch of the blades of the rotor being tested can be either cyclically or collectively controlled in the usual fashion. No attempt has been made to show in detail the various servo-mechanism, measuring apparatus, etc., since these devices per se and the manner in which they would be connected are well known to those skilled in the art of testing and such details would merely unnecessarily confuse this disclosure.

In operation, almost any operating condition of the rotor can be simulated. With the arm stationary, the conditions will correspond to those which would obtain with an actual helicopter while hovering stationary above the ground. By driving the rotor arm at any desired rate of revolution, the outer tip on which the rotor is mounted can be made to travel at any desired rate up to perhaps 100 miles per hour. By appropriate control of the driving engine, clutch and brake for the rotating arm the effect of gusts upon the rotor can be readily simulated and the performance of the rotor under such conditions studied. While the path of the rotor would be circular under these conditions, any effects due to centrifugal force can be readily corrected for by suitable calculations.

The strain gages 38 on the spring 15 provide a very sensitive and accurate means for measuring the lift of the rotor. Obviously, however, any other known type of lift measuring apparatus could be employed.

Many other modifications could be made without departing from the spirit and scope of the invention as defined in the appended claim.

We claim as our invention:

Apparatus for testing lifting rotors under simulated flight conditions comprising a stationary support, a rotatable support carried at the upper end of said stationary support for rotation about a generally vertical axis, an elongated arm pivoted to said rotatable support on a second axis generally perpendicular to said first axis, said arm extending outwardly from said supports, means for rotatably mounting a lifting rotor to be tested on the outer end of said arm including a rotor drive shaft, means carried by said arm for driving said drive shaft and means for measuring the moment about said second axis developed by the rotation of a rotor being tested including means acting between said arm and said rotatable support tending to hold said arm against pivotal movement about said second axis, and means for detecting the stress in said last mentioned means.

AGNEW E. LARSEN.
JOHN B. ATHERHOLT.

REFERENCES CITED

The following references are of record in the file of this patent:

UNITED STATES PATENTS

| Number | Name | Date |
| --- | --- | --- |
| 1,039,889 | Brianne | Oct. 1, 1912 |
| 2,455,053 | Flint | Nov. 30, 1948 |

FOREIGN PATENTS

| Number | Country | Date |
| --- | --- | --- |
| 213,057 | Germany | Sept. 8, 1909 |
| 469,059 | France | May 11, 1914 |